Figure 1:
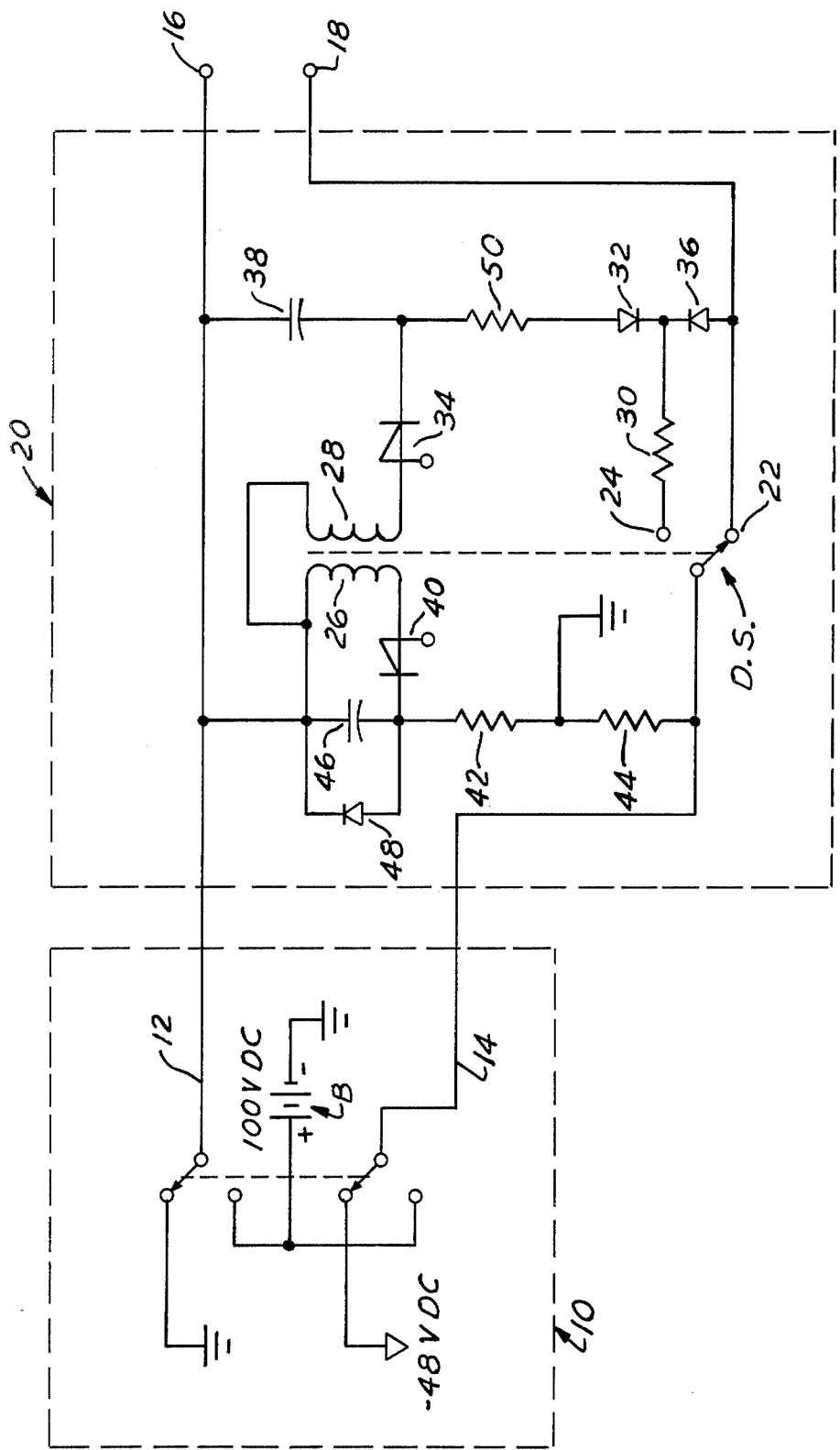

United States Patent [19]

Denman et al.

[11] 4,109,112

[45] Aug. 22, 1978

[54] TELEPHONE ISOLATION DEVICE

[75] Inventors: Donald E. Denman; Samuel L. Haring, both of Mansfield, Ohio

[73] Assignee: Del-Tronics Associates, Inc., Mansfield, Ohio

[21] Appl. No.: 840,774

[22] Filed: Oct. 11, 1977

Related U.S. Application Data

[63] Continuation of Ser. No. 690,622, May 27, 1976, abandoned.

[51] Int. Cl.² .................... H04M 1/00; H04B 3/46
[52] U.S. Cl. ................... 179/81 R; 179/17 R
[58] Field of Search .............. 179/2 R, 2 A, 18 B, 179/81 R, 17 R, 175.3 R

[56] References Cited

U.S. PATENT DOCUMENTS

| | | | |
|---|---|---|---|
| 3,150,237 | 9/1964 | Baldik | 179/81 R |
| 3,471,649 | 10/1969 | Carle | 179/81 R |
| 3,725,613 | 4/1973 | Allen | 179/175.3 R |
| 3,867,588 | 2/1975 | Pickens | 179/175.3 R |
| 3,919,487 | 11/1975 | Gabrielson | 179/175.3 R |

*Primary Examiner*—Kathleen H. Claffy
*Assistant Examiner*—Joseph A. Popek
*Attorney, Agent, or Firm*—W. Preston Hickey

[57] ABSTRACT

A telephone isolation device having a latching relay operated switch in one of the telephone conductors which when the relay is actuated brings a voltage dividing branch circuit that includes a restoring coil of the relay into parallel with a subscriber's telephone. If the telephone is connected and off of the hook, the low impedance of the telephone keeps the flow of current to the restoring coil below an operable value. When the telephone is placed on the hook, all current thereafter passes through the restoring coil to again connect the telephone to the telephone conductors. The disconnect coil of the relay is actuated by applying a positive 100 volt DC current to both lines of the telephone system.

19 Claims, 1 Drawing Figure

TELEPHONE ISOLATION DEVICE

This is a continuation of application Ser. No. 690,622 filed May 27, 1976, now abandoned.

The present invention relates to a disconnect switch for a pair of electrical conductors, which disconnect switch can be remotely controlled by means of the conductors to disconnect a low impedance from the conductors when it is desired; and more particularly to a telephone isolation device for disconnecting a subscriber's telephone from the lines when he has left it off of the hook.

BACKGROUND OF THE INVENTION

Ever since the early stages of the use of telephone systems, and particularly after party lines came into existence, a need has existed for remotely disconnecting a subscriber's telephone when he leaves it off of the hook. Hertofore when a subscriber has left his telephone off of the hook, it has been necessary for a repair man from the central office to travel to the subscriber's telephone and determine whether a malfunction existed, or whether the telephone was merely off of the hook. When one subscriber to a party line system leaves his telephone off of the hook, it is impossible for any of the other telephones on the party line to either dial out or have their telephone rung by an incoming call.

An object of the present invention therefore is the provision of a new and improved device to be installed remotely on a pair of communication lines for disconnecting the remote location when a low resistance condition exists across the lines at the remote location.

Another object of the invention is the provision of a new and improved telephone isolation device which can be operated from the central office to disconnect a subscriber's telephone from the system when the subscriber leaves his telephone off of the hook, and which will automatically restore the service when the subscriber puts the telephone back on the hook.

A still further object of the invention is the provision of a new and improved telephone isolation device which includes built-in resistances which can be monitored by the central office to aid in determining remotely whether or not the isolation device is operable.

Further objects and advantages of the invention will become apparent to those skilled in the art to which the invention relates from the following description of preferred embodiments described with reference to the accompanying drawing forming a part of this specification.

The solitary FIGURE of the drawings is a schematic drawing of a telephone communication system in which the portions that are located at the central office are bounded by a dotted line 10 and from which a tip line 12 and a ring line 14 run to the disconnect terminals 16 and 18 respectively of a subscriber's telephone. The circuitry of an isolation device which embodies principles of the present invention is located within the dotted rectangule 20 which is located adjacent to the disconnect terminals 16 and 18. It will be understood that branches of the tip and ring lines, not shown, may exist anywhere between the central office and the telephone isolation device.

The telephone isolation device shown in the drawing generally comprises a disconnect switch DS that is shown as a single pole double throw switch having a contact 22 in the ring line and a contact 24 in a branch circuit later to be described. The disconnect switch DS is part of an encapsulated reed magnetic latching relay K having a forward biasing coil 26 which when actuated moves the pole of the switch from contact 22 to contact 24, and a reverse biasing coil 28 which when actuated moves the pole from the contact 24 to the contact 22. The branch circuit that is connected to the contact 24 includes a resistor 30, a diode 32, a trigger diode 34 and the reverse biasing coil 28. Both the forward and reverse biasing coils 26 and 28 are connected to the tip line 12. Another diode 36 is connected between the resistor 30 and the contact 22, and the diodes 32 and 36 are arranged back to back to prevent a flow of positive current from the resistor 30 through the diodes. A condenser 38 is connected in parallel with the reverse biasing coil 28, and the trigger diode 34 to provide a positive snap action for the latching relay in a reverse direction. Another trigger diode 40 and a resistor 42 are connected in series circuit between the forward biasing coil 26 and ground. The resistor 42 has 5.6 times the resistance of the resistor 30, and a similar resistor 44 is connected between ground and the pole of the disconnect switch DS. In order to provide a snap action for the forward biasing coil, a condenser 46 is connected in parallel with the forward biasing coil 26 and trigger diode 40, and the trigger diodes 40 and 34 are connected back to back to pass a positive current from the tip line to the branch circuit, and ground, respectively. Another diode 48 is connected in parallel with the condenser 46 to quickly dissipate a charge in the condenser 46 when the polarity of the tip line is quickly changed from positive to negative. A resistor 50 may be placed in series circuit between the trigger diode 34 and condenser 38 and the diode 32 to provide lightning protection for the components of the branch line.

It will be understood that all of the circuitry that is utilized at the central office is not shown in the schematic drawing and that only such circuitry as is necessary for an understanding of the present invention is herein shown and described. In order to prevent corrosion of the electrical components most telephone systems maintain a tip line at ground, and the ring line at a negative voltage relative to ground as for example —48 volts DC. Several arrangements are utilized to provide the ring signal, and in a commonly used system, a 160 volt AC current is applied to the ring line to operate the bell of the subscriber's telephone. In some instances AC currents of different frequencies are utilized to ring the different telephones on a party system. In most telephone systems, once the subscriber lifts the telephone from the hook, a telephone having approximately 120 ohms resistance is placed between the tip and ring lines. Thereafter, circuitry not shown at the central office switches the ring line to a positive voltage as for example, positive 48 volt DC, and thereafter this positive current is modulated to carry the communication.

While the telephone isolation device shown in the drawing may be actuated in a number of different ways, it is herein shown and described as being actuated at the central office by the application of 100 volts positive DC current to both the tip and ring lines. The 100 volt positive current is shown originating from the battery B and being connected to a double pole double throw switch S-1, one pole of which is connected to the tip line 12 and the other pole of which is connected to the ring line 14. In the normal condition the tip pole is connected to ground and the ring pole is connected to the negative 48 volt DC supply. When it is desired to remotely actuate the isolation device 20, switch S-1 is momentarily thrown to connect the positive 100 volt DC to the tip line and the ring line to actuate the forward biasing coil 26 of the latching relay K as will later be described. It will be understood that the resistance 30 of the branch circuit is many times greater than the resistance of the subscriber's telephone when it is operating, and that the resistance of resistors 42 and 44 are several times greater than the resistance of resistor 30. In the embodiment shown, the resistance of resistor 30 is approximately 1000 times greater than that of the subscriber's telephone and the resistances of resistors 42 and 44 are approximately 5.6 times greater than the resistance of the resistor 30.

When the positive voltage is applied to the tip line, a slow flow of electrons proceeds from ground through the resistor 42 to the condenser 46. When the charge across the condenser 46 exceeds the trip voltage of the trigger diode 40, the diode 40 triggers to permit a rapid flow of current through the coil 46 from one side of the condenser 46 to the other. In the embodiment shown the trigger voltage is approximately 8 volts. This flow of current actuates the relay in a forward direction to move the pole of the switch DS in a forward direction to make contact with the contact 24. This disconnects the ring line from the disconnect terminal 18 of the subscriber's telephone. Immediately thereafter the switch S-1 is moved back to its original position, shown in the drawing, so that all of the other telephones connected to the tip and ring lines will now be operable. Assuming that the subscriber's telephone was connected to the terminals and that it was off of the hook, to provide a 120 ohms resistance between the tip and ring lines, the flow of current from the ring line through the resistance 30 is divided between the branch line that extends through the reverse biasing coil 28 and the 120 ohm resistance of the subscriber's telephone. Inasmuch as the resistor 30 in the embodiment shown is approximately 100,000 ohms, the flow of current is very small and that which does go through the resistor 30 is now divided between the branch circuit and the 120 ohm resistance of the subscriber's telephone. The resistance of the reverse biasing coil 28 is many times larger than is that of the subscriber's telephone so that the flow of current is primarily through the subscriber's telephone when it is off of the hook and so that the reverse biasing coil 28 does not have a sufficient flow of current to trip the relay. When the subscriber places his telephone back on the hook to disconnect the ring and tip lines, the flow of current through the resistor 30, nows sees an open circuit at the subscriber's telephone and the voltage at the diode 32 immediately increases. This increased voltage is applied to the condenser 38 until it builds up to approximately 8 volts, at which time the trigger diode 34 is triggered to cause a flow of current through the reverse biasing coil 28 to in turn energize the relay in its reverse direction and move the pole of the disconnect switch DS back into contact with the contact 22 of the ring line. The relay stays latched in this position and continuity of the ring line is established with the subscriber's telephone.

It will be seen that the branch circuit including the reverse biasing coil 28 forms a voltage dividing circuit relative to the subscriber's operating telephone, and that the resistance values of the branch circuit are such that when the subscriber's telephone is disconnected to provide a very large impedance, the branch circuit is immediately actuated.

The telephone isolation device of the present invention does more than just remotely disconnect the subscriber's telephone. When trouble is reported on the circuit, the central office can disconnect both the tip and ring lines from all voltage and from ground. The resistance of the tip line and the ring line to ground can be measured for leakage, and because the resistances of resistors 42 and 44 are substantially equal, and of a very high value, it can be determined if continuity has been established all the way to the isolation device 20. Without the isolation device 20, if the subscriber's telephone was off of the hook, it could not be established whether or not discontinuity existed in either line. By obtaining a resistance reading that is substantially equal to that of the resistors 42 and 44, it can be determined that continuity exists in both the tip line and the ring line to the isolation device. If a considerably higher resistance is measured at the central office, obviously a discontinuity exists. If a resistance reading of approximately 120 ohms is obtained, it is established that the subscriber's telephone is off of the hook. The isolation device can then be actuated as previously described by applying 100 volts DC to both the tip and ring lines. If after the isolation device is actuated, the switch S-1 can be moved to an open position and the resistance of the line 14 can be again measured. Because the relay K is a latching relay it will stay in its forward position which disconnects the subscriber's telephone and brings the resistor 30 into the circuit. If now the resistance in the ring line is measured with a positive flow of current, and very little leakage occurs in the ring line, only the resistance of resistor 44 will be seen by the central office. If on the other hand, the resistance is measured with a flow of negative polarity current between the ring and tip lines, the resistance observed will drop by reason of the flow of current through the resistor 30. It can then be positively established that the branch circuit of the isolation device is operable and that the isolation device will be operated satisfactorily when the subscriber places his telephone back on the hook. It will also be seen that the continuity to the subscriber's telephone and the operability of the isolation device can be checked remotely from the central office without the necessity of dispatching a repair man to the subscriber's telephone to establish service.

It will now be apparent that there has been provided an isolation device which can be actuated by a pair of communication lines to disconnect a remote point on the lines, and that it will reconnect the lines automatically when a predetermined high resistance condition again exists on the remote side of the isolation device. It will further be seen that the isolation device makes it possible to check out continuity and operability of the isolation device from the control point. The isolation device provides all of these functions by circuitry that is simple, rugged in construction, and reliable in its operation.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

We claim:

1. In a communication system having a control switching station, a remote sending and receiving station of predetermined resistance, and a pair of conductors between the control switching station and the remote station; a switch connected to one of said conductors at said remote station, a branch circuit connected between said switch and the other of said conductors, said switch having a first condition wherein it connects said switching station to said remote station and a second condition wherein said switch connects said control switching station to said branch circuit, said branch circuit including a current limiting resistance that has a greater ohmic value than said predetermined resistance, a first one-way gate in said branch circuit connected between said current limiting resistance and said other conductor, a second one-way gate connected between said current limiting resistance and said one of said conductors on the remote station side of said switch, said one-way gates being back to back, and whereby when said switch is in said second condition said remote station is effectively isolated to current flow through said one of said conductors in a first flow direction while sensing current flow in the reverse direction will show a limited flow characterized by said current limiting resistance in said branch circuit.

2. In the communications system of claim 1, a first test resistance connected between said one of said conductors and ground when said switch is in its first condition, said first test resistance being considerably greater than said current limiting resistance, whereby resistance interrogation of said line at said central switching station can determine continuity to said switch.

3. In the communication system of claim 1, actuating means in said branch circuit for changing said switch from said second condition to said first condition, said actuating means being actuated by an increase in current flow through said branch circuit which occurs when said predetermined resistance is removed at said remote station.

4. In the communications system of claim 3, means connected between said other of said conductors and ground for changing said switch from its first condition to its second condition when an energy source is supplied to said other of said conductors which is of the same polarity relative to said one of said conductors as is stopped by said one-way gates when said switch is in its second condition.

5. The communications system of claim 4 wherein said last mentioned means and said actuating means comprise a dual circuit magnetic latching relay.

6. The communications system of claim 5 including first and second trigger means with respective ones being arranged back to back in respective circuits of said magnetic latching relay, said trigger means being oriented to pass an energy flow in said other conductor of the same polarity as is stopped by said one-way gates when connected to said one of said conductors.

7. The communications system of claim 6 including first and second condensers respective ones of which are connected between said other of said conductors and the opposite sides of respective trigger means.

8. The communications system of claim 7 including a second test resistance similar in ohmic value to said first test resistance and connected between ground and said other of said conductors to assume its second condition.

9. Component circuitry comprising: switch means having an input and first and second outputs and being adapted to connect said first output to said input when in a first condition and to connect said second output to said input when in a second condition, a first resistance having one end connected to said second output, a first diode connected between the other end of said resistance and said first output, a power terminal, a branch circuit connected between the other end of said resistance and said power terminal, a second diode in said branch circuit, said diodes being back to back to prevent current of a given polarity from flowing from said input through said diodes, and first actuating means connected to said power terminal for changing said switch means from said first condition to said second condition when a current of said given polarity is supplied to said power terminal.

10. The circuitry of claim 9 wherein said switch means is changed from said second condition to said first condition by second actuating means located in said branch circuit between said power terminal and said second diode and which is actuated when current drain flow through said first diode from said resistance effectively ceases to build up the potential drop through said branch circuit.

11. The circuitry of claim 10 wherein said first actuating means is connected between said power terminal and ground, said first actuating means being actuated by a direct current between said power terminal and ground.

12. The circuitry of claim 11 including a second resistance that is considerably higher in ohmic value than said first resistance and which is connected between said input of said switch and ground when said switch is in its first condition and a third value similar in ohmic resistance to said second resistance and connected in series circuit with said first actuating means.

13. The circuitry of claim 12 including first and second trigger means in series circuit with said first and second actuating means respectively and each of which are arranged to pass a current of a given polarity from said power terminal.

14. The circuitry of claim 13 including first and second condensers respectively connected between said power terminal and the opposite side of respective first and second trigger means.

15. A telephone isolation device comprising: a magnetic latching relay having forward and reverse actuating coils, a power terminal, switch means having an input terminal and first and second output terminals, said switch means being in a first condition when it connects said input to said first output terminal and being in a second condition when it connects said input terminal to said second output terminal, a first diode connected between the other end of said first resistance and the first output terminal, a second diode, a branch circuit connecting said power terminal to said other end of said first resistance and including said reverse actuating coil and said second diode, said forward actuating coil changing said switch means from said first condition to said second condition when energized and said reverse actuating coil changing said switch means from said second condition to said first condition when energized, said diodes being arranged back to back to prevent current flow from said second output terminal of a given polarity, and whereby a voltage of a given polarity when applied to said power terminal latches said switch means in its second condition, following which said switch means stays in its second condition until a reverse polarity is applied between said input and power terminals and an extremely high resistance condition occurs between said first output terminal and said power terminal.

16. The telephone isolation device of claim 15 including a second resistance connected between said input terminal and ground when said switch means is in said first condition, and a third resistance in series between said forward latching coil of said relay and ground, said second and third resistances being of considerably higher value than said first resistance.

17. The telephone isolation device of claim 16 including a first condenser connected in parallel circuit with said reverse actuating coil and a second condenser connected in parallel circuit with said forward actuating coil.

18. The telephone isolation device of claim 17 including a third diode in series with said third resistance and said power terminal.

19. A telephone isolation device comprising: a magnetic latching relay having forward and reverse actuating coils, a tip line terminal, switch means having a ring input terminal, a ring output and a disconnect terminal, said switch means being in a first condition when it connects said ring input terminal to said ring output terminal and being in a second condition when it connects said ring input terminal to said disconnect terminal, a first resistance having one end connected to said disconnect terminal, a first diode connected between the other end of said first resistance and said ring output terminal, a second diode, a branch circuit connecting said tip line to said other end of said first resistance and including said reverse actuating coil and said second diode, said forward actuating coil changing said switch means from said first condition to said second condition when a given polarity is applied to said tip terminal and said reverse actuating coil changing said switch means from said second condition to said first condition when said tip terminal is grounded and a negative voltage is supplied said disconnect terminal, said diodes being arranged back to back to prevent a positive voltage from passing through said diodes from said disconnect terminal, first trigger means connected between said forward actuating coil and ground, and second trigger means in said branch circuit, said first and second trigger means being arranged back to back to permit positive current flow therethrough from said tip terminal, and whereby a momentary predetermined voltage applied to both said tip terminal and ring input terminal causes said switch means to be moved to its second condition following which a grounding of said tip terminal and negative voltage on said ring input terminal will allow a high resistance between said tip terminal and said ring output terminal to cause said switch means to be moved to its first condition.

* * * * *